(12) United States Patent
Kim et al.

(10) Patent No.: US 11,073,718 B2
(45) Date of Patent: Jul. 27, 2021

(54) COLOR CONVERSION PANEL HAVING BLUE LIGHT CUTTING FILTER AND DISPLAY DEVICE INCLUDING THE SAME

(71) Applicant: Samsung Display Co., Ltd., Yongin-si (KR)

(72) Inventors: Kyung-Bae Kim, Seongnam-si (KR); Il Gon Kim, Seoul (KR); Hyun Joon Kim, Suwon-si (KR)

(73) Assignee: Samsung Display Co., Ltd.

( * ) Notice: Subject to any disclaimer, the term of this patent is extended or adjusted under 35 U.S.C. 154(b) by 242 days.

(21) Appl. No.: 15/861,507

(22) Filed: Jan. 3, 2018

(65) Prior Publication Data

US 2018/0203292 A1 Jul. 19, 2018

(30) Foreign Application Priority Data

Jan. 19, 2017 (KR) .................. 10-2017-0009159

(51) Int. Cl.
| | | |
|---|---|---|
| *G02B 5/20* | (2006.01) | |
| *G02B 5/30* | (2006.01) | |
| *G02F 1/1335* | (2006.01) | |
| *G02F 2/02* | (2006.01) | |
| *G02F 1/13357* | (2006.01) | |

(52) U.S. Cl.
CPC ......... *G02F 1/133514* (2013.01); *G02B 5/20* (2013.01); *G02B 5/30* (2013.01); *G02F 1/133512* (2013.01); *G02F 1/133528* (2013.01); *G02F 1/133617* (2013.01); *G02F 2/02* (2013.01)

(58) Field of Classification Search
CPC .......... B82Y 20/00; G02B 5/20; G02B 5/201; G02B 5/204; G02B 5/206; G02B 5/22; G02B 5/223; G02B 5/30; G02F 1/133509; G02F 1/133512; G02F 1/133514; G02F 1/133528; G02F 2001/133548; G02F 2001/133614; G02F 1/133617; G02F 1/133621; G02F 2/02; G02F 2202/36; H01L 27/3211; H01L 27/322; H01L 51/5284; Y10S 977/774
USPC ...................................... 359/483.01, 491.01
See application file for complete search history.

(56) References Cited

U.S. PATENT DOCUMENTS

| | | | | |
|---|---|---|---|---|
| 9,719,639 B2* | 8/2017 | Gu | ..................... | G02F 1/133617 |
| 2008/0001528 A1* | 1/2008 | Eida | ..................... | H01J 29/898 |
| | | | | 313/501 |
| 2010/0091219 A1* | 4/2010 | Rho | ................... | G02F 1/133512 |
| | | | | 349/68 |

(Continued)

FOREIGN PATENT DOCUMENTS

| | | |
|---|---|---|
| KR | 10-2013-0104862 | 9/2013 |
| KR | 10-2014-0074495 | 6/2014 |

(Continued)

*Primary Examiner* — Ryan S Dunning
(74) *Attorney, Agent, or Firm* — Innovation Counsel LLP (57) ABSTRACT

An exemplary embodiment of the present disclosure provides a color conversion display panel including: a light blocking member and a blue light cutting filter disposed on a color conversion substrate; a first color conversion layer and a second color conversion layer disposed on the blue light cutting filter to include nanocrystals; and a transmission layer disposed on the color conversion substrate, wherein the blue light cutting filter overlaps side surfaces of the first color conversion layer, the second color conversion layer, and the transmission layer.

17 Claims, 4 Drawing Sheets

(56) References Cited

U.S. PATENT DOCUMENTS

| | | | |
|---|---|---|---|
| 2016/0161799 A1* | 6/2016 | Morishima | G02F 1/133514 |
| | | | 349/71 |
| 2017/0194382 A1* | 7/2017 | Lee | H01L 51/5246 |
| 2018/0029072 A1* | 2/2018 | Li | G02F 1/1335 |
| 2018/0031912 A1* | 2/2018 | Zhang | B41M 3/003 |

FOREIGN PATENT DOCUMENTS

| KR | 10-2016-0084557 | 7/2016 |
|---|---|---|
| KR | 10-2016-0084794 | 7/2016 |

* cited by examiner

COLOR CONVERSION PANEL HAVING BLUE LIGHT CUTTING FILTER AND DISPLAY DEVICE INCLUDING THE SAME

CROSS-REFERENCE TO RELATED APPLICATION

This application claims priority to and the benefit of Korean Patent Application No. 10-2017-0009159 filed in the Korean Intellectual Property Office on Jan. 19, 2017, the disclosure of which is incorporated herein by reference in its entirety.

BACKGROUND

(a) Field

The present disclosure relates to a color conversion panel and a display device including the same.

(b) Description of the Related Art

A liquid crystal display used as a display device includes two electrodes forming an electric field, a liquid crystal layer, a color filter, a polarizer, and the like. However, light emitted from a light source and passing through the liquid crystal layer, the color filter, and the polarizer is partially lost. Light loss also occurs in a display device using a color filter such as a liquid crystal display, and an organic light emitting diode display. A display device including a color conversion panel has been researched to reduce a loss of the light. The above information disclosed in this Background section is only for enhancement of understanding of the background of the present disclosure and therefore it may contain information that does not form a prior art that is already known to a person of ordinary skill in the art.

SUMMARY

Exemplary embodiments of the present disclosure have been made in an effort to provide an overcoat layer having a flat surface while covering a color conversion layer and a transmission layer, and a polarization layer disposed on the overcoat layer. Exemplary embodiments of the present disclosure have also been made in an effort to improve the reliability and a display quality of a color conversion display panel and a display device including the color conversion display panel. The technical objects to be achieved by the present disclosure are not limited to the aforementioned technical objects, and other unmentioned technical objects will be obviously understood by those skilled in the art from the description below. An exemplary embodiment of the present disclosure provides a color conversion display panel including: a light blocking member and a blue light cutting filter disposed on a color conversion substrate; a first color conversion layer and a second color conversion layer disposed on the blue light cutting filter and to include nanocrystals; and a transmission layer disposed on the color conversion substrate, wherein the blue light cutting filter overlaps side surfaces of the first color conversion layer, the second color conversion layer, and the transmission layer. At least one of the blue light cutting filter and the light blocking member may include at least two regions having different thicknesses. The light blocking member may have a first region having a first thickness and a second region having a second thickness, the first thickness may correspond to a distance between two surfaces of the light blocking member in parallel with the color conversion substrate in the first region, the second thickness may correspond to a distance between two surfaces of the light blocking member in parallel with the color conversion substrate in the second region, and the second thickness may be greater than the first thickness. The second thickness may be about 1.1 times to about 2 times the first thickness. The blue light cutting filter may include a third region having a third thickness and a fourth region having a fourth thickness, the third thickness may correspond to a distance between two surfaces of the blue light cutting filter in parallel with the color conversion substrate in the third region, the fourth thickness may correspond to a distance between two surfaces of the blue light cutting filter in parallel with the color conversion substrate in the fourth region, and the fourth thickness may be greater than the third thickness. The fourth thickness may be about 1.1 times to about 2 times the third thickness. The second region and the fourth region may be disposed between the first color conversion layer and the second color conversion layer that are adjacent to each other, and between one of the first color conversion layer and the second color conversion layer and the transmission layer that are adjacent to each other. The color conversion display panel may further include: an overcoat layer disposed between the first color conversion layer, the second color conversion layer, and the transmission layer; and a polarization layer disposed on the overcoat layer, and the polarization layer may include a wire grid polarizer. An exemplary embodiment of the present disclosure provides a display device including: a lower display panel configured to include a thin film transistor; a color conversion display panel configured to overlap the lower display panel; and a light unit disposed in a rear surface of the lower display panel to emit blue light toward the lower display panel and the color conversion display panel, wherein the color conversion display panel includes: a light blocking member and a blue light cutting filter disposed between a conversion substrate and the lower display panel; a first color conversion layer and a second color conversion layer disposed between the blue light cutting filter and the lower display panel and to include nanocrystals; and a transmission layer disposed between the color conversion substrate and the lower display panel, wherein the blue light cutting filter overlaps side surfaces of the first color conversion layer, the second color conversion layer, and the transmission layer. The display device may further include: an overcoat layer disposed between the first color conversion layer, the second color conversion layer, and the transmission layer; and a polarization layer disposed between the overcoat layer and the lower display panel, and the polarization layer may include a wire grid polarizer. The lower display panel may include a pixel electrode connected with the thin film transistor, and the color conversion display panel may further include a common electrode disposed between the polarization layer and the lower display panel. According to the exemplary embodiments, the color conversion layer and the transmission layer can improve flatness of one surface of the overcoat layer by minimizing a step thereof. Accordingly, a polarization layer can be disposed on the overcoat layer without defects or discontinuities. Therefore, it is possible to improve the reliability and a display quality of the color conversion display panel and the display device including the color conversion display panel.

DETAILED DESCRIPTION OF THE EMBODIMENTS

The present disclosure will be described more fully hereinafter with reference to the accompanying drawings, in which exemplary embodiments of the present disclosure are shown. As those skilled in the art would realize, the described embodiments may be modified in various ways, all without departing from the spirit or scope of the present disclosure.

To clearly describe the present disclosure, parts that are irrelevant to the description may be omitted, and like numerals may refer to like or similar constituent elements throughout the specification.

Further, since sizes and thicknesses of constituent members shown in the accompanying drawings may be arbitrarily given for better understanding and ease of description, the present disclosure is not limited to the illustrated sizes and thicknesses. In the drawings, the thickness of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, it can be directly on the other element or one or more intervening elements may also be present. In contrast, when an element is referred to as being "directly on" another element, there may be no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and its variations such as "comprises" or "comprising" will be understood to imply an inclusion of stated elements but not an exclusion of any other elements.

Figure 1:
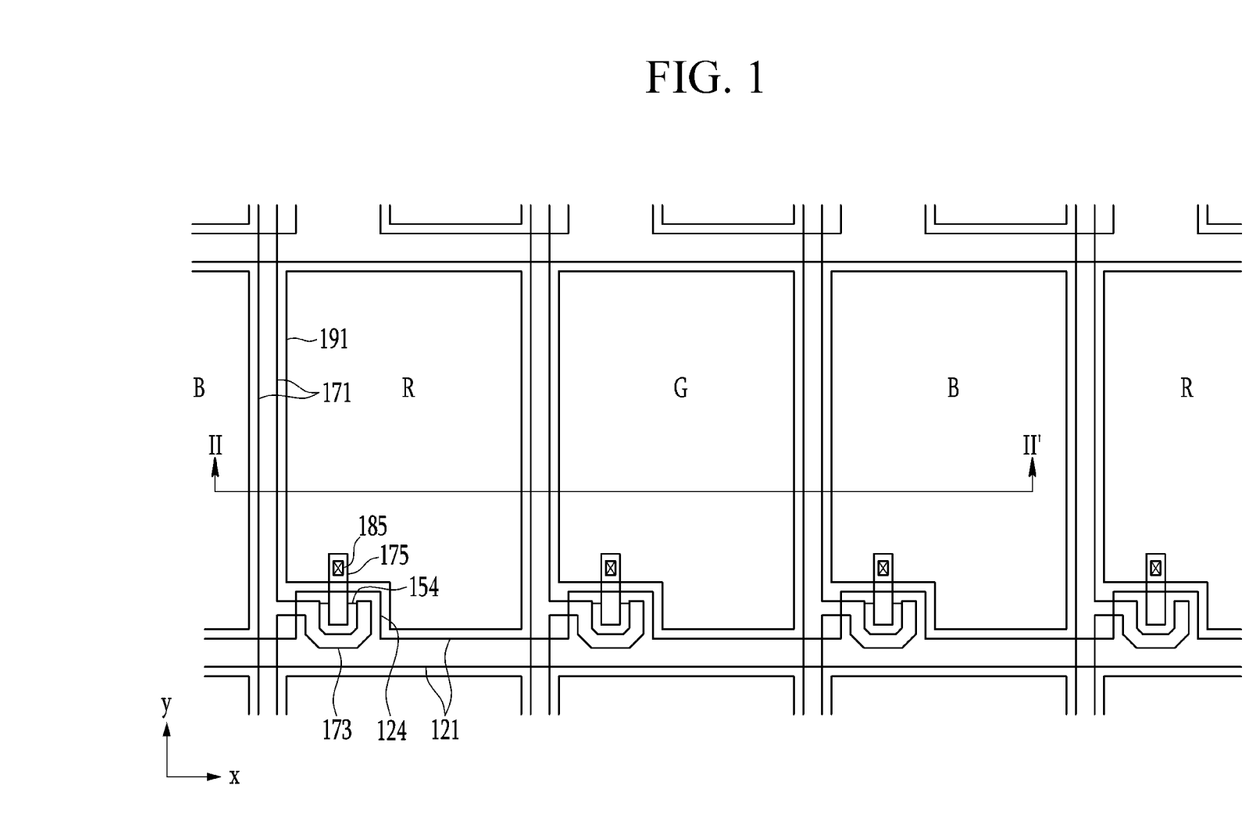
FIG. 1 is a top plan view illustrating a display device according to an exemplary embodiment of the present disclosure.

Further, in the specification, the phrase "in a plan view" means when an object portion is viewed from above, and the phrase "in a cross-sectional view" means when a cross-section taken by vertically cutting an object portion is viewed from the side. Hereinafter, a display device according to an exemplary embodiment will be described with reference to FIG. 1 and FIG. 2. FIG. 1 is a top plan view illustrating a display device according to an exemplary embodiment of the present disclosure, and FIG. 2 is a cross-sectional view taken along a line II-II of FIG. 1.

Figure 2:
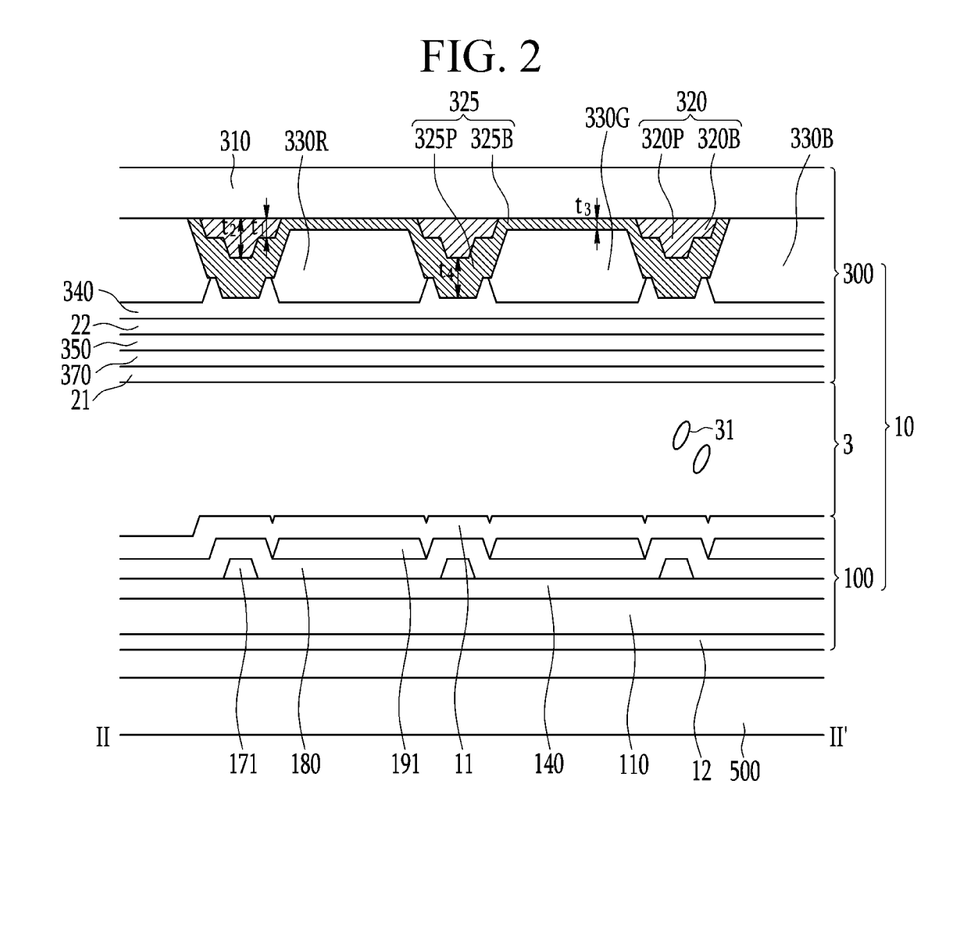
FIG. 2 is a cross-sectional view taken along a line II-II of FIG. 1.

Referring to FIG. 1 and FIG. 2, the display device according to the present exemplary embodiment includes a light unit 500, and a display panel 10 disposed on the light unit 500.

The light unit 500 may include a light source disposed in a rear surface of the display panel 10 to emit blue light, and a light guide (not shown) that receives the blue light and guides the received light in a direction of the display panel 10. When the display panel 10 is an organic light emitting display panel, the light unit 500 may be omitted.

The light unit 500 may include at least one light emitting diode. For example, the light unit 500 may include a blue light emitting diode.

The light source may be an edge type disposed on at least one lateral surface of the light guide, or a direct type in which the light source of the light unit 500 is disposed directly under the light guide, but the present disclosure is not limited thereto.

The display panel 10 may include a liquid crystal panel that forms a vertical electric field, but is not limited thereto. For example, the display panel 10 may include a display panel such as a liquid crystal panel that forms a horizontal electric field, a plasma display panel (PDP), an organic light emitting diode (OLED) display, a surface conduction electron-emitter display (SED), a field emission display (FED), a vacuum fluorescent display (VFD), and an e-paper.

Hereinafter, the display panel that forms the vertical electric field will be described in detail.

The display panel 10 includes a lower display panel 100, a color conversion display panel 300 overlapping the lower display panel 100, and a liquid crystal layer 3 disposed between the lower display panel 100 and the color conversion display panel 300.

The lower display panel 100 may include a first polarization layer 12 disposed between a first substrate 110 and the light unit 500. The first polarization layer 12 serves to polarize light emitted from the light unit 500.

As the first polarization layer 12, at least one of an applied polarization layer, a coated polarization layer, and a wire grid polarizer may be used. The first polarization layer 12 may be disposed on one side of the first substrate 110 in various forms such as a film form, a coating form, an attachment form, a printing form, and the like.

A plurality of pixels are arranged in a matrix shape on the first substrate 110. The first substrate 110 may be disposed between the first polarization layer 12 and the liquid crystal layer 3.

A gate line 121 extending in an x direction and including a gate electrode 124; a gate insulating layer 140 disposed between the gate line 121 and the liquid crystal layer 3; a semiconductor layer 154 disposed between the gate insulating layer 140 and the liquid crystal layer 3; a data line 171 and a drain electrode 175 disposed between the semiconductor layer 154 and the liquid crystal layer 3 to extend in a y direction and connected with a source electrode 173; and a passivation layer 180 disposed between the data line 171 and the liquid crystal layer 3 may be disposed between the first substrate 110 and the liquid crystal layer 3. A pixel electrode 191 is disposed on the passivation layer 180, and may be physically and electrically connected to the drain electrode 175 through a contact hole 185 of the passivation layer 180. A first alignment layer 11 may be disposed between the pixel electrode 191 and the liquid crystal layer 3.

The semiconductor layer 154 forms a channel layer between the source electrode 173 and the drain electrode 175. The gate electrode 124, the semiconductor layer 154, the source electrode 173, and the drain electrode 175 may constitute one thin film transistor.

The color conversion display panel 300 includes a color conversion substrate 310 that overlaps the lower display panel 100. A light blocking member 320 is disposed between the color conversion substrate 310 and the liquid crystal layer 3.

The light blocking member 320 may be disposed between a first color conversion layer 330R and a second color conversion layer 330G, and between a transmission layer 330B and one of the first color conversion layer 330R and the second color conversion layer 330G. The light blocking member 320 can define an area where the first color conversion layer 330R, the second color conversion layer 330G, and the transmission layer 330B are disposed apart from each other.

The light blocking member 320 may include a first region 320B having a first thickness $t_1$ and a second region 320P having a second thickness $t_2$. Herein, the first thickness $t_1$ corresponds to a distance between two surfaces of the light blocking member 320 in parallel with the color conversion substrate 310 in the first region 320B, and the second thickness $t_2$ corresponds to a distance between two surfaces of the light blocking member 320 in parallel with the color conversion substrate 310 in the second region 320P. In the present disclosure, a thickness corresponds to a distance between two planar surfaces along a stacked direction of the constituent element. According to an exemplary embodiment, the two surfaces may include a predetermined step generated depending on a manufacturing process, or may include a predetermined inclination. The first thickness $t_1$ may be different from the second thickness $t_2$, and the second thickness $t_2$ may be greater than the first thickness $t_1$. For example, the second thickness $t_2$ may be about 1.1 times to about 2 times the first thickness $t_1$.

According to the present exemplary embodiment, the light blocking member 320 may be formed by any process for including the first region 320B and the second region 320P. For example, a halftone mask, a three-tone mask, or a four-tone mask may be used.

The second region 320P of the light blocking member 320 may protrude toward the liquid crystal layer 3 with reference to one surface of the first region 320B. The second region 320P may have an island shape positioned on a surface of the first region 320B.

In FIG. 2, the first region 320B and the second region 320P are illustrated to be formed to have a step, but the present disclosure is not limited thereto. For example, the first region 320B and the second region 320P may have any shape (e.g., a curved shape) having different thicknesses.

The second region 320P may be located in a valley between the first color conversion layer 330R, the second color conversion layer 330G, and the transmission layer 330B that are adjacent to each other. According to the present exemplary embodiment, the light blocking member 320 includes the second region 320P having the second thickness $t_2$ so that a volume of the light blocking member 320 disposed in the valley may increase and a volume occupied by an overcoat layer 340 may be reduced, as compared with a case where the light blocking member 320 is uniformly formed to have the first thickness $t_1$.

A blue light cutting filter 325 is disposed on the color conversion substrate 310. A portion of the blue light cutting filter 325 may overlap the light blocking member 320.

The blue light cutting filter 325 includes a third region 325B having a third thickness $t_3$ and a fourth region 325P having a fourth thickness $t_4$. Herein, the third thickness $t_3$ corresponds to a distance between two surfaces of the blue light cutting filter 325 in parallel with the color conversion substrate 310 in the third region 325B, and the fourth thickness $t_4$ corresponds to a distance between two surfaces of the blue light cutting filter 325 in parallel with the color conversion substrate 310 in the fourth region 325P. In the present disclosure, a distance between two planar surfaces is defined as a thickness. According to an exemplary embodiment, the two surfaces may include a predetermined step generated depending on a manufacturing process, or may include a predetermined inclination.

The third thickness $t_3$ may be different from the fourth thickness $t_4$, and the fourth thickness $t_4$ may be greater than the third thickness $t_3$. For example, the fourth thickness $t_4$ may be about 1.1 times to about 2 times the third thickness $t_3$.

The blue light cutting filter 325 may be formed by any process for including the third region 325B and the fourth region 325P. For example, a halftone mask, a three-tone mask, or a four-tone mask may be used.

The third region 325B may overlap the first color conversion layer 330R and the second color conversion layer 330G. The fourth region 325P may be a portion that protrudes toward the liquid crystal layer 3 based on the third region 325B. The fourth region 325P may have an island shape positioned on a surface of the third region 325B.

In FIG. 2, the third region 325B and the fourth region 325P are illustrated to be formed to have a step, but the present disclosure is not limited thereto. For example, the third region 325B and the fourth region 325P may have any shape (e.g., a curved shape) having different thicknesses.

The fourth region 325P may overlap the light blocking member 320, and particularly the second region 320P. The second region 320P and the fourth region 325P may overlap a valley between the first color conversion layer 330R, the second color conversion layer 330G, and the transmission layer 330B that are adjacent to each other.

According to the present exemplary embodiment, the blue light cutting filter 325 may have a shape that protrudes between the first color conversion layer 330R and the second color conversion layer 330G, and between the transmission layer 330B and one of the first color conversion layer 330R and the second color conversion layer 330G. In addition, the blue light cutting filter 325 may overlap side surfaces of the first color conversion layer 330R, the second color conversion layer 330G, and the transmission layer 330B. This is due to a thickness of the fourth region 325P of the blue light cutting filter 325 itself or the second region 320P overlapping the fourth region 325P.

As described above, the light blocking member 320 and the blue light cutting filter 325 may include relatively thick regions (e.g., the second region 320P and the fourth region 325P), and the thick regions may be disposed in a valley between the first color conversion layer 330R, the second color conversion layer 330G, and the transmission layer 330 that are adjacent to each other, to reduce a thickness (or a volume) of the overcoat layer 340 disposed in the valley.

Meanwhile, the blue light cutting filter 325 is disposed to overlap regions for emitting red and green light, but is not disposed in a region for emitting blue light. The blue light cutting filter 325 may have an opening that overlaps a region for emitting blue light.

The blue light cutting filter 325 may include a first region that overlaps the first color conversion layer 330R and a second region that overlaps the second color conversion layer 330G. In this case, the first region and the second region of the blue light cutting filter 325 may be connected with each other.

The blue light cutting filter 325 transmits light having a wavelength other than a blue wavelength band, and blocks light having a blue wavelength band. The blue light cutting filter 325 may include any material for performing the above-mentioned light-filtering effect, and may be, for example, a yellow color filter.

In FIG. 2, the blue light cutting filter 325 is shown to contact the color conversion substrate 310. However, the display device according to the present exemplary embodiment is not limited thereto. For example, the color conversion display panel 300 may further include a buffer layer disposed between the blue light cutting filter 325 and the color conversion substrate 310.

The first color conversion layer 330R and the second color conversion layer 330G may be disposed on the blue light cutting filter 325, and the transmission layer 330B may be disposed on the color conversion substrate 310.

The first color conversion layer 330R and the second color conversion layer 330G may convert the light emitted from the light unit 500 into light having a different color that is deviated from the original color emitted from the light unit 500. The first color conversion layer 330R may be a first color conversion layer, and the second color conversion layer 330G may be a second color conversion layer. The transmission layer 330B may transmit light without a color conversion. For example, when blue light is introduced into the transmission layer 330B, the transmission layer 330B may emit blue light.

The first color conversion layer 330R may include a nanocrystal for converting the introduced blue light into red light. The nanocrystal may include at least one of a phosphor and a quantum dot.

When the first color conversion layer 330R includes a red phosphor, the red phosphor may be one of (Ca, Sr, Ba)S, $(Ca, Sr, Ba)_2Si_5N_8$, $CaAlSiN_3$, $CaMoO_4$, and $Eu_2Si_5N_8$. The first color conversion layer 330R may include at least one kind of red phosphors.

The second color conversion layer 330G may include a nanocrystal for converting the introduced blue light into green light. The nanocrystal may include at least one of a phosphor and a quantum dot.

When the second color conversion layer 330G includes a green phosphor, the green phosphor may be one of yttrium aluminum garnet, $(Ca, Sr, Ba)_2SiO_4$, $SrGa_2S_4$, barium magnesium aluminate (BAM), α-SiAlON, β-SiAlON, $Ca_3Sc_2Si_3O_{12}$, $Tb_3Al_5O_{12}$, $BaSiO_4$, CaAlSiON, and $(Sr_{1-x}Ba_x)Si_2O_2N_2$, but the present disclosure is not limited thereto. The second color conversion layer 330G may include at least one kind of green phosphors. In this case, x may be any number between 0 and 1.

The first color conversion layer 330R and the second color conversion layer 330G may include a quantum dot instead of a phosphor. The quantum dot can be selected from a group II-VI compound, a group III-V compound, a group IV-VI compound, a group IV element, a group IV compound, and a combination thereof.

For the group II-VI compound, a binary compound selected from CdSe, CdTe, ZnS, ZnSe, ZnTe, ZnO, HgS, HgSe, HgTe, MgSe, MgS, and a mixture thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof, may be employed. For the group III-V compound, a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, ANAs, AlNSb, AlPAs, AlPSb, InNP, InNAs, InNSb, InPAs, InPSb, and a mixture thereof; or a quaternary compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof, may be employed. For the group IV-VI compound, a binary compound selected from SnS, SnSe, SnTe, PbS, PbSe, PbTe, and a mixture thereof; a ternary compound selected from SnSeS, SnSeTe, SnSTe, PbSeS, PbSeTe, PbSTe, SnPbS, SnPbSe, SnPbTe, and a mixture thereof; or a quaternary compound selected from SnPbSSe, SnPbSeTe, SnPbSTe, and a mixture thereof, may be employed. For the IV group element, Si, Ge, or a mixture thereof may be selected. For the IV group compound, a binary compound selected from SiC, SiGe, and a mixture thereof may be employed.

In this case, the binary compound, the ternary compound, or the quaternary compound may exist in a uniform concentration or in a partially different concentration in particles. The quantum dot may include multiple quantum dots, and the quantum dots may have a core/shell structure in which one quantum dot surrounds another quantum dot. An interface between a core and a shell may have a concentration gradient such that a concentration of an element in the shell decreases toward a center thereof.

The quantum dot may have a full width at half maximum (FWHM) of the light-emitting wavelength spectrum that is equal to or less than about 45 nm, preferably equal to or less than about 40 nm, and more preferably equal to or less than about 30 nm, and in this range, the color purity or the color reproducibility may be improved. In addition, since light emitted through the quantum dot is emitted in all directions, a viewing angle of light may be improved.

The quantum dot may have a shape such as a nano-particle having a spherical shape, a pyramid shape, a multi-arm shape, or a cubic shape, or may be a nanotube, a nanowire, a nanofiber, a planar nano-particle, etc.

The transmission layer 330B may include a resin that transmits blue light incident thereto. The transmission layer 330B positioned in a region for emitting blue light emits the incident blue light as it is without including a nanocrystal. Although not illustrated herein, in some exemplary embodiments, the transmission layer 330B may further include a dye or a pigment.

The first color conversion layer 330R, the second color conversion layer 330G, and the transmission layer 330B may include a photosensitive resin as an example, and may be manufactured by a photolithography process. Alternatively, the first color conversion layer 330R, the second color conversion layer 330G, and the transmission layer 330B may be manufactured by a printing process, and when manufactured by the printing process, they may include materials other than the photosensitive resin. In the present specification, it is illustrated that the color conversion layers 330R and 330G, the transmission layer 330B, and the light blocking member 320 are formed by the photolithography process or the printing process, but the present disclosure is not limited thereto.

According to one embodiment, at least one of the first color conversion layer 330R, the second color conversion layer 330G, and the transmission layer 330B may include a scatterer (not shown). For example, the first color conversion layer 330R, the second color conversion layer 330G, and the transmission layer 330B may respectively include the scatterer. In another example, the transmission layer 330B may include the scatterer, while the first color conversion layer 330R and the second color conversion layer 330G may not include the scatterer. In addition, contents of the scatterers included in the first color conversion layer 330R, the second color conversion layer 330G, and the transmission layer 330B may be different from each other.

The scatterer may include any material that can evenly scatter incident light, and for example, may include one of $TiO_2$, $ZrO_2$, $Al_2O_3$, $In_2O_3$, ZnO, $SnO_2$, $Sb_2O_3$, and ITO.

The overcoat layer 340 is disposed between the first color conversion layer 330R, second color conversion layer 330G, and transmission layer 330B and the liquid crystal layer 3. The overcoat layer 340 planarizes a surface that faces the liquid crystal layer 3 while covering the first color conversion layer 330R, the second color conversion layer 330G, and the transmission layer 330B.

According to the present exemplary embodiment, a thickness difference between a first portion of the overcoat layer 340 that overlaps the first color conversion layer 330R, the second color conversion layer 330G, and the transmission layer 330B and a second portion of the overcoat layer 340 disposed between the first color conversion layer 330R, the second color conversion layer 330G, and the transmission layer 330B adjacent thereto may be in a range of about 1 μm to about 2 μm.

The overcoat layer 340 is disposed on a front surface of the color conversion substrate 310, and thus may be disposed on not only one of the surfaces of the first color conversion layer 330R, the second color conversion layer 330G, and the transmission layer 330B, but also spaces or valleys therebetween. In other words, the second region 320P of the light blocking member 320 and the fourth region 325P of the blue light cutting filter 325 may be disposed on valleys corresponding to the spaces between the first color conversion layer 330R, the second color conversion layer 330G, and the transmission layer 330B that are adjacent to each other. The overcoat layer 340 may have a small volume occupied in the valley due to the thick regions (e.g., the second region 320P and the fourth region 325P) of the light blocking member 320 and the blue light cutting filter 325.

Accordingly, the overcoat layer 340 may require a smaller amount of overcoat material in comparison with a case of including the light blocking member 320 and the blue light cutting filter 325 having no step in the valley, thereby reducing a manufacturing cost. In addition, since a thickness for planarization of the overcoat layer 340 is decreased, it is possible to reduce a loss of light when the light passes through the overcoat layer 340.

According to the present exemplary embodiment, the flatness of one surface that faces the liquid crystal layer 3 of the overcoat layer 340 may be increased by minimizing the step. As a result, other constituent elements stacked on the overcoating layer 340 can be stably positioned seamlessly or substantially steplessly.

In addition, although not illustrated in the present example, an optical filter layer (not illustrated) may be further included between the overcoat layer 340 and the first color conversion layer 330R, second color conversion layer 330G, and transmission layer 330B.

The optical filter layer serves to prevent damage and extinction of phosphors or quantum dots included in the first color conversion layer 330R and the second color conversion layer 330G, and serves to reflect or absorb light other than light having a specific wavelength while transmitting the light having the specific wavelength, during a high-temperature process after the first color conversion layer 330R, the second color conversion layer 330G, and the transmission layer 330B are formed.

The optical filter layer may have a structure in which an inorganic layer having a high refractive index and an inorganic layer having a low refractive index are alternately stacked to form about 10 to 20 layers. That is, the optical filter layer may have a structure in which a plurality of layers having different refractive indices are stacked. In this case, the optical filter layer may reflect or absorb light having a specific wavelength. To that end, the optical filter layer utilizes a principle of transmitting and/or reflecting light having a specific wavelength using reinforcement and/or destructive interference between an inorganic layer having a high refractive index and an inorganic layer having a low refractive index.

The optical filter layer may include at least one of $TiO_2$, $SiN_x$, $SiO_y$, TiN, AlN, $Al_2O_3$, $SnO_2$, $WO_3$, and $ZrO_2$. For example, the optical filter layer may have a structure in which $SiN_x$ and $SiO_y$ are alternately stacked. In $SiN_x$ and $SiO_y$, x and y determine a chemical composition ratio, and can be controlled depending on a process condition for forming a layer.

A second polarization layer 22 is disposed between the overcoat layer 340 and the liquid crystal layer 3. The second polarization layer 22 may be disposed on a planar surface of the overcoat layer 340 toward the liquid crystal layer 3. Since the overcoat layer 340 has the planar surface, the second polarizer layer 22 may be stably formed without a step or a break.

The second polarization layer 22 may be at least one of an applied polarization layer, a coated polarization layer, and a wire grid polarization layer, and may be, for example, a wire grid polarization layer including a metal pattern. The second polarization layer 22 may be positioned between the overcoat layer 340 and the liquid crystal layer 3 by various methods such as a film form, an application form, an attachment form, a printing form, and the like.

An insulating layer 350 may be disposed between the second polarization layer 22 and the liquid crystal layer 3. When the second polarization layer 22 is made of a metal, the insulating layer serves to insulate the second polarization layer 22 from a common electrode 370 to be described later. In an exemplary embodiment in which the second polarization layer 22 is not made of a metal and a short circuit between the common electrode 370 and the second polarization layer 22 does not cause a problem, the insulating layer 350 may be omitted.

The common electrode 370 is disposed between the insulating layer 350 and the liquid crystal layer 3. When the insulating layer 350 is omitted, the common electrode 370 may be disposed between the second polarizer layer 22 and the liquid crystal layer 3. In the present example, the exemplary embodiment in which the common electrode 370 is disposed between the color conversion substrate 310 and the liquid crystal layer 3 has been described, but the present disclosure is not limited thereto. For example, the common electrode 370 may be disposed in the lower display panel 100.

The common electrode 370 receiving a common voltage generates an electric field together with the pixel electrode 191 to arrange a plurality of liquid crystal molecules 31 disposed in the liquid crystal layer 3.

A second alignment layer 21 is disposed between the common electrode 370 and the liquid crystal layer 3. The liquid crystal layer 3 includes the liquid crystal molecules 31, and the alignment of the liquid crystal molecules 31 is controlled by the electric field generated between the pixel electrode 191 and the common electrode 370. Images can be displayed by controlling transmittance of light emitted from the light unit 500 depending on the alignment of the liquid crystal molecules 31 in the liquid crystal layer 3.

Figure 3:
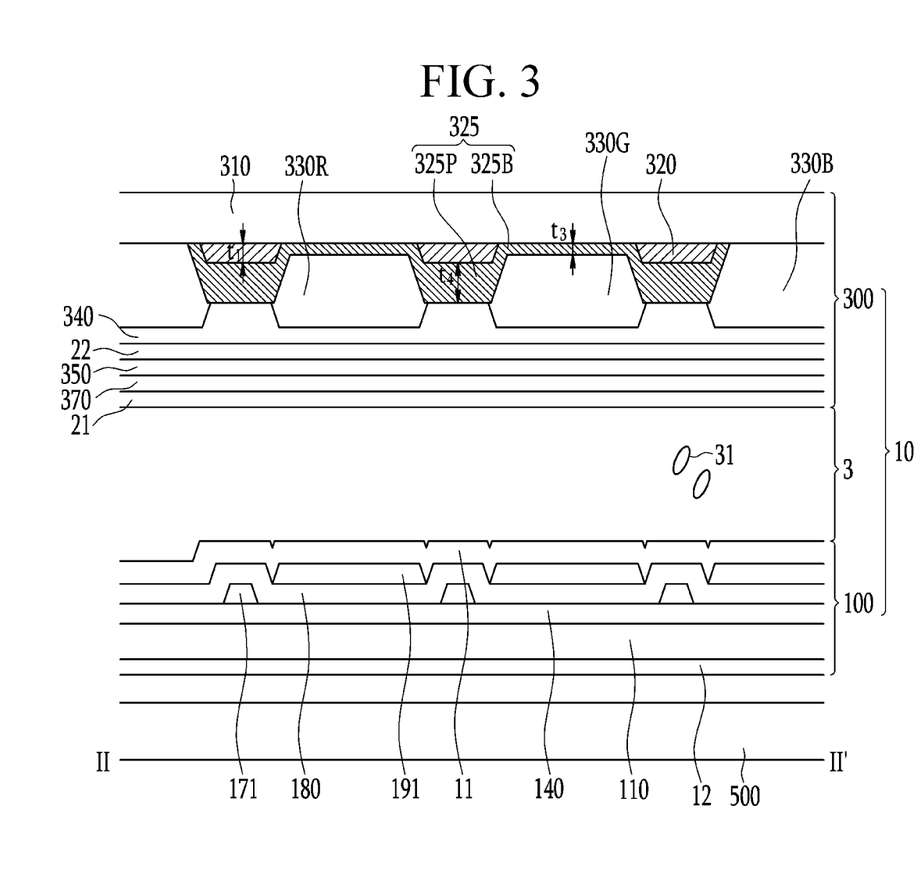
FIG. 3 and FIG. 4 are cross-sectional views according to variations of FIG. 2.
Figure 4:
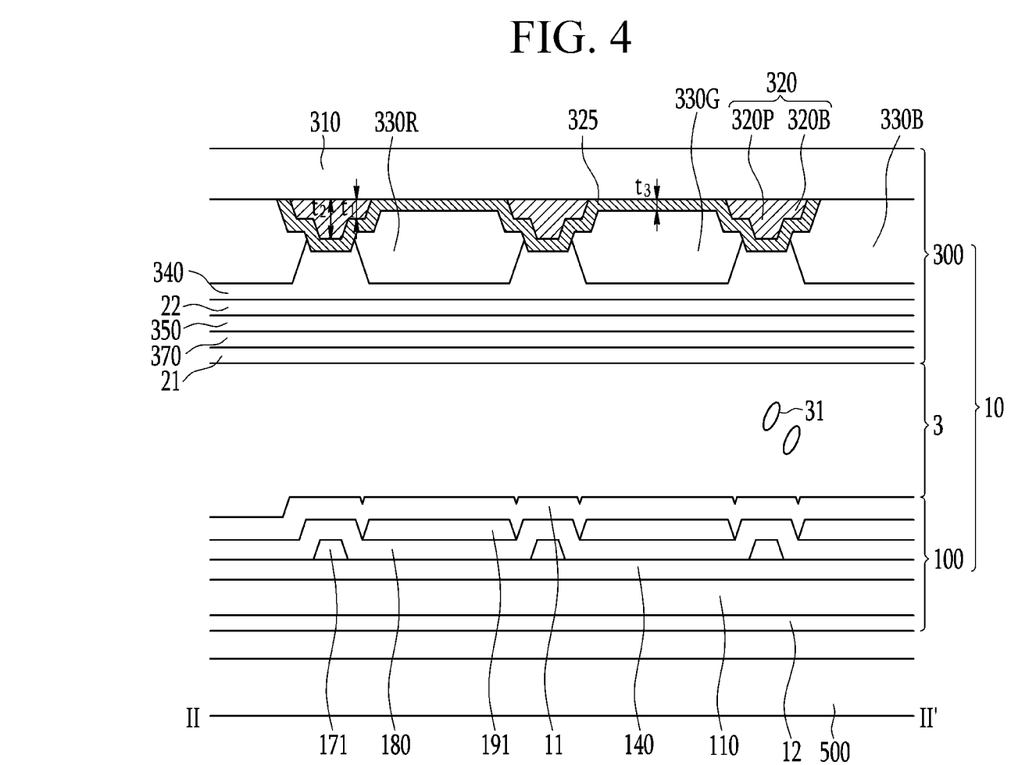

Hereinafter, a display device according to variations will be respectively described with reference to FIG. 3 and FIG. 4 in addition to FIG. 1. FIG. 3 and FIG. 4 are cross-sectional views according to the variations of FIG. 2. Descriptions related to the same components as those of the embodiment described with reference to FIG. 1 and FIG. 2 may be omitted.

First, referring to FIG. 3, the display device according to a first variation includes a display panel 10 and a light unit 500 disposed in a rear surface of the display panel 10.

The display panel 10 includes a lower display panel 100, a color conversion display panel 300 overlapping the lower display panel 100, and a liquid crystal layer 3 disposed between the lower display panel 100 and the color conversion display panel 300.

The color conversion display panel 300 includes a color conversion substrate 310 configured to overlap the lower display panel 100, and a light blocking member 320 disposed between the color conversion substrate 310 and the liquid crystal layer 3. In the first variation, the light blocking member 320 may have a first thickness $t_1$ over an entire area.

The light blocking member 320 is disposed between the first color conversion layer 330R, the second color conversion layer 330G, and the transmission layer 330B that are adjacent to each other. The light blocking member 320 partitions a region in which the first color conversion layer 330R, the second color conversion layer 330G, and the transmission layer 330B are disposed. The light blocking member 320 may have an opening that overlaps the first color conversion layer 330R, the second color conversion layer 330G, and the transmission layer 330B.

A blue light cutting filter 325 is disposed between the light blocking member 320 and the liquid crystal layer 3.

The blue light cutting filter 325 includes a third region 325B having a third thickness $t_3$ and a fourth region 325P having a fourth thickness $t_4$. The third thickness $t_3$ and the fourth thickness $t_4$ may be different from each other, and the fourth thickness $t_4$ may be greater than the third thickness $t_3$. For example, the fourth thickness $t_4$ may be about 1.1 times to about 2 times the third thickness $t_3$.

The third region 325B may overlap the first color conversion layer 330R and the second color conversion layer 330G. The fourth region 325P may be a portion that protrudes from the third region 325B. The fourth region 325P may have an island shape positioned on a surface of the third region 325B.

The fourth region 325P may overlap the light blocking member 320, and particularly may overlap the second region 320P.

In the first variation, the blue light cutting filter 325 may have a shape that protrudes between the first color conversion layer 330R and the second color conversion layer 330G, and between the transmission layer 330B and one of the first color conversion layer 330R and the second color conversion layer 330G. In addition, the blue light cutting filter 325 may overlap side surfaces of the first color conversion layer 330R, the second color conversion layer 330G, and the transmission layer 330B.

Since constituent elements of the lower display panel 100, the color conversion display panel 300, and the liquid crystal layer 3 other than the above-mentioned elements are the same as those described with reference of FIG. 1 and FIG. 2, a description thereof will be omitted.

Next, referring to FIG. 4, a display device according to a second variation includes a display panel 10 and a light unit 500 disposed in a rear surface of the display panel 10.

The display panel 10 includes a lower display panel 100, a color conversion display panel 300 overlapping the lower display panel 100, and a liquid crystal layer 3 disposed between the lower display panel 100 and the color conversion display panel 300.

The color conversion display panel 300 includes a color conversion substrate 310 configured to overlap the lower display panel 100, and a light blocking member 320 disposed between the color conversion substrate 310 and the liquid crystal layer 3. The light blocking member 320 may include a first region 320B having a first thickness $t_1$ and a second region 320P having a second thickness $t_2$. The first thickness $t_1$ may be different from the second thickness $t_2$, and the first thickness $t_1$ may be smaller than the second thickness $t_2$. The second thickness $t_2$ may be greater than the first thickness $t_1$. For example, the second thickness $t_2$ may be about 1.1 times to about 2 times the first thickness $t_1$.

The second region 320P of the light blocking member 320 may protrude from the first region 320B. The second region 320P may have an island shape positioned on a surface of the first region 320B.

The second region 320P may be located in a valley between the first color conversion layer 330R, the second color conversion layer 330G, and the transmission layer 330B that are adjacent to each other. As a thickness of the second region 320P increases, a height of the valley in which the overcoat layer 340 is stacked may be reduced. According to the second variation, the light blocking member 320 includes the second region 320P having the second thickness $t_2$ so that a volume of the light blocking member 320 disposed in the valley may be reduced, as compared with a case where the light blocking member 320 is uniformly formed to have the first thickness $t_1$.

As a result, a volume of the overcoat layer 340 filling the valley may decrease, and one surface of the overcoat layer 340 covering the first color conversion layer 330R, the second color conversion layer 330G, and the transmission layer 330B may be planarized.

Since constituent elements of the lower display panel 100, the color conversion display panel 300, and the liquid crystal layer 3 other than the above-mentioned elements are the same as those described with reference of FIG. 1 and FIG. 2, a description thereof will be omitted.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the present disclosure.

DESCRIPTION OF SYMBOLS

100: lower display panel
300: color conversion display panel
310: color conversion substrate
320: light blocking member
325: blue light cutting filter

What is claimed is:
1. A color conversion display panel comprising:
a blue light cutting filter directly disposed on a color conversion substrate;
a light blocking member directly disposed on the color conversion substrate;
a first color conversion layer and a second color conversion layer comprising nanocrystals; and
a transmission layer disposed on the color conversion substrate,
wherein the first color conversion layer and the second color conversion layer are disposed on the blue light cutting filter, wherein the blue light cutting filter includes at least two regions having different thicknesses, and the at least two regions are integrally coupled to each other, and wherein the blue light cutting filter continuously extends to overlap the first color conversion layer and the second color conversion layer.

2. The color conversion display panel of claim 1, wherein the light blocking member includes at least two regions having different thicknesses.

3. The color conversion display panel of claim 1, wherein the light blocking member has a first region having a first thickness and a second region having a second thickness, the first thickness corresponds to a distance between two surfaces of the light blocking member in parallel with the color conversion substrate in the first region, the second thickness corresponds to a distance between two surfaces of the light blocking member in parallel with the color conversion substrate in the second region, and the second thickness is greater than the first thickness.

4. The color conversion display panel of claim 3, wherein the second thickness is about 1.1 times to about 2 times the first thickness.

5. The color conversion display panel of claim 3, wherein the blue light cutting filter includes a third region having a third thickness and a fourth region having a fourth thickness, the third thickness corresponds to a distance between two surfaces of the blue light cutting filter in parallel with the color conversion substrate in the third region, the fourth thickness corresponds to a distance between two surfaces of the blue light cutting filter in parallel with the color conversion substrate in the fourth region, and the fourth thickness is greater than the third thickness.

6. The color conversion display panel of claim 5, wherein the fourth thickness is about 1.1 times to about 2 times the third thickness.

7. The color conversion display panel of claim 5, wherein the second region and the fourth region are disposed between the first color conversion layer and the second color conversion layer that are adjacent to each other, and between one of the first color conversion layer and the second color conversion layer and the transmission layer that are adjacent to each other.

8. The color conversion display panel of claim 1, further comprising:

an overcoat layer disposed on the first color conversion layer, the second color conversion layer, and the transmission layer.

9. A display device comprising:

a lower display panel configured to include a thin film transistor; and a color conversion display panel configured to overlap the lower display panel, wherein the color conversion display panel comprises:

a blue light cutting filter disposed between a color conversion substrate and the lower display panel and comprising a first region that overlaps the first color conversion layer and a second region that overlaps the second color conversion layer, wherein the first region and the second region have different thicknesses and are integrally coupled to each other;

a first color conversion layer and a second color conversion layer disposed between the blue light cutting filter and the lower display panel and comprising nanocrystals; and a transmission layer disposed between the color conversion substrate and the lower display panel.

10. The display device of claim 9, wherein the color conversion display panel further comprises a light blocking member disposed between the color conversion substrate and the lower display panel, and the light blocking member includes at least two regions having different thicknesses.

11. The display device of claim 10, wherein the light blocking member has a first region having a first thickness and a second region having a second thickness, the first thickness corresponds to a distance between two surfaces of the light blocking member in parallel with the color conversion substrate in the first region, the second thickness corresponds to a distance between two surfaces of the light blocking member in parallel with the color conversion substrate in the second region, and the second thickness is greater than the first thickness.

12. The display device of claim 11, wherein the second thickness is about 1.1 times to about 2 times the first thickness.

13. The display device of claim 11, wherein the blue light cutting filter includes a third region having a third thickness and a fourth region having a fourth thickness, the third thickness corresponds to a distance between two surfaces of the blue light cutting filter in parallel with the color conversion substrate in the third region, the fourth thickness corresponds to a distance between two surfaces of the blue light cutting filter in parallel with the color conversion substrate in the fourth region, and the fourth thickness is greater than the third thickness.

14. The display device of claim 13, wherein the fourth thickness is about 1.1 times to about 2 times the third thickness.

15. The display device of claim 13, wherein the second region and the fourth region overlap each other, and the second region and the fourth region are disposed between the first color conversion layer and the second color conversion layer that are adjacent to each other, and between one of the first color conversion layer and second color conversion layer and the transmission layer that are adjacent to each other.

16. The display device of claim 9, further comprising:

an overcoat layer disposed on the first color conversion layer, the second color conversion layer, and the transmission layer.

17. The display device of claim 16, wherein the lower display panel includes a pixel electrode connected with the thin film transistor.

* * * * *